US007466674B2

(12) United States Patent
Okagawa et al.

(10) Patent No.: US 7,466,674 B2
(45) Date of Patent: Dec. 16, 2008

(54) MOBILE COMMUNICATION CONTROL SYSTEM, MOBILE COMMUNICATION CONTROL METHOD, ROUTER, SERVER AND DATA STRUCTURE

(75) Inventors: Takatoshi Okagawa, Yokosuka (JP); Manhee Jo, Yokohama (JP); Katsutoshi Nishida, Yokohama (JP); Noriteru Shinagawa, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 1011 days.

(21) Appl. No.: 10/666,177

(22) Filed: Sep. 22, 2003

(65) Prior Publication Data
US 2004/0058683 A1 Mar. 25, 2004

(30) Foreign Application Priority Data
Sep. 20, 2002 (JP) ............................. 2002-276196

(51) Int. Cl.
*H04Q 7/00* (2006.01)
(52) U.S. Cl. .................. 370/328; 370/392; 370/410; 370/465; 370/475; 455/433; 455/456.1
(58) Field of Classification Search ................ None
See application file for complete search history.

(56) References Cited
U.S. PATENT DOCUMENTS

| 6,256,300 | B1 |  | 7/2001 | Ahmed et al. |  |
| 6,515,974 | B1 | * | 2/2003 | Inoue et al. | 370/331 |
| 6,842,456 | B1 | * | 1/2005 | Chen et al. | 370/401 |
| 6,958,988 | B1 | * | 10/2005 | Okagawa et al. | 370/338 |
| 7,191,226 | B2 | * | 3/2007 | Flykt et al. | 709/218 |
| 7,221,666 | B2 | * | 5/2007 | Inoue et al. | 370/338 |

| 2001/0036164 | A1 | * | 11/2001 | Kakemizu et al. | 370/331 |

FOREIGN PATENT DOCUMENTS

| EP | 1 032 178 | 8/2000 |
| EP | 1 102 509 | 5/2001 |
| EP | 1 182 832 | 2/2002 |

(Continued)

OTHER PUBLICATIONS

Yasuhisa Hayashi et. al "Separation of Terminal Identifier and Routing Address for Mobile Net- Internet Convergence"The Institute of elelctrionics, Information and Communication Engineers. B- 7—25 Technical Report of IEICE, 2002, Two (2) cover pages and p. 252.

(Continued)

*Primary Examiner*—Wing F. Chan
*Assistant Examiner*—Brian Roberts
(74) *Attorney, Agent, or Firm*—Oblon, Spivak, McClelland, Maier & Neustadt, P.C.

(57) ABSTRACT

A mobile communication control method includes: converting a first address of a destination mobile terminal which is included in a packet as a destination address, to a second address of the destination mobile terminal which is associated with the first address of the destination mobile terminal, in a source router; and converting the second address of the destination mobile terminal which is included in the received packet as a destination address, to the first address of the destination mobile terminal which is associated with the second address of the destination mobile terminal, in a destination router.

21 Claims, 5 Drawing Sheets

FOREIGN PATENT DOCUMENTS

| | | |
|---|---|---|
| JP | 2001-111621 | 4/2001 |
| JP | 2001-230803 | 8/2001 |

OTHER PUBLICATIONS

C. Perkins, Network Working Group Request for Comments: 2002 Category: Standards Track, pp. 1-70, "IP Mobility Support", Oct. 1996.

C. Perkins, Network Working Group Request for Comments: 3220 Obsoletes: 2002 Category: Standards Track, pp. 1-86, "IP Mobility Support for IPv4", Jan. 2002.

D. B. Johnson, IETF Mobile IP Working Group Internet-Draft Draft-letf-Mobileip-ipv6-18, pp. 1-130, "Mobility Support in IPv6", Jun. 1, 2002.

R. Vadali, et al., IEEE 54th Vehicular Technology Conference, vol. 1 of 4, pp. 2731-2735, XP-010562472, "Agent-Based Route Optimization for Mobile IP", Oct. 7, 2001.

\* cited by examiner

MOBILE COMMUNICATION CONTROL SYSTEM, MOBILE COMMUNICATION CONTROL METHOD, ROUTER, SERVER AND DATA STRUCTURE

CROSS REFERENCE TO RELATED APPLICATION

This application is based upon and claims the benefit of priority from the prior Japanese Patent Application No. P2002-276196, filed on Sep. 20, 2002; the entire contents of which are incorporated herein by reference.

BACKGROUND OF THE INVENTION

1. Field of the Invention

The present invention relates to a mobile communication control system, a mobile communication control method, a router, a server and a data structure.

2. Description of the Related Art

In a conventional IP (Internet Protocol) network, a "Mobile IP" technique for controlling a mobility of a mobility node (a mobile terminal), by transferring an IP packet destined for the mobility node to a home agent managing location information of the mobility node, and by encapsulating for transfer the IP packet destined for the mobility node from the home agent to the mobility node is proposed.

In the Mobile IP technique, the mobility node notifies a care of address used in a foreign network to the home agent, when the mobility node moves from a home network to the foreign network. The home agent holds a relationship between the care of address and a home address assigned to the home agent fixedly as binding cache information.

A correspondent node to the mobility node transmits the IP packet destined for the mobility node, using the home address fixedly assigned to the mobility node. The IP packet including the home address as a destination address is transferred to the home agent in the home network of the mobility node. The home agent encapsulates for transfer the IP packet transmitted from the correspondent node, using the care of address which is a current IP address of the mobility node.

In the Mobile IP technique, the communication route via the home agent is called a "triangle route". To realize a "route optimization" for transferring the IP packet from the correspondent node to the mobility node directly without passing through the home agent, the mobility node can notify the care of address to the correspondent node and the correspondent node can transfer the IP packet to the mobility node directly using the care of address.

However, there is a problem in that downward communication from the correspondent node to the mobility node is performed through a route including the home agent in the hone network of the mobility node, so that the communication route becomes redundant (a triangle route) in the conventional Mobile IP technique.

There is a location privacy problem in that the correspondent node receives the care of address including the current location information of the mobility node when a system whereby the mobility node notifies the care of address to the correspondent node directly is used, that is, when a system for performing route optimization is used, so that the current location information is revealed to the correspondent node in the conventional Mobile IP technique.

There is a problem in that the care of address is used as a source address of the IP packet transmitted from the mobility node in upward communication from the mobility node to the correspondent node, the current location information of the mobility node is revealed to the correspondent node even when route optimization is not performed in the conventional Mobile IP technique.

There is a problem in that the home agent encapsulates the IP packet, so that an overhead of the IP packet increases in the conventional Mobile IP technique.

There is a problem in that an extended header is used when the IP packet is encapsulated in upward communication or downward communication using route optimization, so that an overhead of the IP packet increases in the conventional Mobile IP technique.

There is a problem in that the IP address of the home agent managing the current location information of the mobility node is notified to the mobility node in advance and the mobility node performs a location registration to the home agent in the home network directly, so that the IP address of the home agent managing and controlling the mobility of the mobility node can be revealed to an outsider and the home agent is vulnerable to unauthorized attacks in the conventional Mobile IP technique.

BRIEF SUMMARY OF THE INVENTION

In viewing of the foregoing, it is an object of the present invention to provide a mobile communication control system, a mobile communication control method, a router, a server and data structure which can prevent the communication route from becoming redundant and the current location information of the mobility node (the mobile terminal) and the IP address of the home agent from being revealed.

A first aspect of the present invention is summarized as a mobile communication control system comprising a server and a plurality of routers.

The server comprises an address manager configured to manage a first address of a destination mobile terminal associated with a second address of the destination mobile terminal; and an instructor configured to instruct a source router connected to a source mobile terminal via a radio circuit to store the first address of the destination mobile terminal associated with the second address of the destination mobile terminal.

The source router comprises a first address memory configured to store the first address of the destination mobile terminal associated with the second address of the destination mobile terminal, in accordance with the instruction from the server; an address converter configured to convert the first address of the destination mobile terminal. Which is included in a packer received from the source mobile terminal as a destination address, to the second address of the destination mobile terminal which is associated with the first address of the destination mobile terminal in the first address memory; and a routing processor configured to route the received packet to a destination router connected to the destination mobile terminal via a radio circuit, in accordance with the converted destination address.

The destination router comprises a second address memory configured to store the first address of the destination mobile terminal associated with the second address of the destination mobile terminal; an address converted configured to convert the second address of the destination mobile terminal which is included in the received packet as a destination address, to the first address of the destination motile terminal which is associated with the second address of the destination mobile terminal in the second address memory; and a packet transferring processor configured to transfer the received packet to the destination mobile terminal, in accordance with the converted destination address.

In the first aspect, the destination router can comprise a selection notifier configured to select the second address of the destination mobile terminal which is associated with the first address of the destination mobile terminal in the second memory, and to notify the selected second address of the destination mobile terminal to the server, when the destination mobile terminal moves into a predetermined area, or when the destination mobile terminal changes to an active state; and the address manager of the server can manage the notified second address of the destination morale terminal associated with the first address of the destination mobile terminal.

In the first aspect, the source router can comprise an inquirer configured to inquire as to the second address of the destination mobile terminal of the server, when the first address memory does not store the second address of the destination mobile terminal associated with the first address of the destination mobile terminal which is included in the packet received from the source mobile terminal as a destination address; and the instructor of the server can instruct the source router to store the first address of the destination mobile terminal associated with the second address of the destination mobile terminal, in accordance with the inquiry from the source router.

In the first aspect, the address manager of the server can update the first address of the destination mobile terminal and the second address of the destination mobile terminal which are associated with each other, in accordance with a movement of the destination mobile terminal or the change of state of the destination mobile terminal.

In the first aspect, the instructor of the server can Instruct the router which is not in a route of the packet from the source mobile terminal to the destination mobile terminal, to delete the managed first address of the destination mobile terminal and the managed second address of the destination mobile terminal.

In the first aspect, the address converter of the source router or the destination router cart distinguish the first address of the destination mobile terminal from the second address of the destination mobile terminal, in accordance with at least one decision bit in the packet.

In the first aspect, the address converter of the source router can convert a first address of the source mobile terminal which is included in a packet received from the source mobile terminal as a source address, to a second address of the source mobile terminal which is associated with the first address of the source mobile terminal; and the address converter of the destination router can convert the second address of the source mobile terminal which is included in the received packer as a source address, to the first address of the source mobile terminal which is associated with the second address of the source mobile terminal.

A second aspect of the present invention is summarized as a mobile communication control method comprising the steps of: A) transmitting a packet including a first address of a destination mobile terminal as a destination address, in a source mobile terminal; B) instructing a source router connected to the source mobile terminal via a radio circuit to store the first address of the destination mobile terminal associated with a second address of the destination mobile terminal, in a server; C) storing the first address of the destination mobile terminal associated with the second address of the destination mobile terminal, in accordance with the instruction from the server, in the source router; D) converting the first address of the destination mobile terminal which is included in the packet received from the source mobile terminal as a destination address, to the second address of the destination mobile terminal which is associated with the first address of the destination mobile terminal, in the source router; E) routing the received packet to a destination routed connected to the destination mobile terminal via radio circuit in accordance with the converted destination address, in the source router; F) converting the second address of the destination mobile terminal which is included in the received packet as a destination address, to the first address of the destination mobile terminal which is associated with the second address of the destination mobile terminal, in the destination router; and G) transferring the received packet to the destination mobile terminal, in accordance with the converted destination address.

A third aspect of the present invention is summarized as a server used in a mobile communication network for transferring a packet from a source mobile terminal to a destination mobile terminal via a plurality of routers.

The server comprises an address manager configured to manage a first address of the destination mobile terminal associated with a second address of the destination mobile terminal; and an instructor configured to instruct a source router connected to the source mobile terminal via a radio circuit to store the first address of the destination mobile terminal associated with the second address of the destination mobile terminal.

In the third aspect, the address manager can update the first address of the destination mobile terminal and the second address of the destination mobile terminal which area associated with each other, in accordance witty a movement of the destination mobile terminal or the change of state of the destination mobile terminal.

In the third aspect, the instructor can instruct the router which is not in a route of the packet from the source mobile terminal to the destination mobile terminal, to delete the managed first address of the destination mobile terminal and the managed second address of the destination mobile terminal.

A fourth aspect of the present invention is summarized as a router connected to a source mobile terminal. The router comprises an inquirer configured to inquire as to a second address of a destination mobile terminal of a server, when a first address memory does not store the second address of the destination mobile terminal associated with a first address of the destination mobile terminal which is included in a packet received frost the source mobile terminal as a destination address; the first address memory configured to store the first address of the destination mobile terminal associated with the second address of the destination mobile terminal, in accordance with an instruction from the server; an address converter configured to convert the first address of the destination mobile terminal which is included in the packet received from the source mobile terminal as a destination address, to the second address of the destination mobile terminal which is associated with the first address of the destination mobile terminal in the first address memory; and a routing processor configured to route the received packet to a destination router connected to the destination mobile terminal via a radio circuit, in accordance with the converted destination address.

In the fourth aspect, the address converter can distinguish the first address of the destination mobile terminal from the second address of time destination mobile terminal, in accordance with at least one decision bit in the packet.

In the fourth aspect, the address converter can convert a first address of the source mobile terminal which is included in the packet received from the source mobile terminal as a source address, to a second address of the destination mobile terminal which is associated with the first address of the destination mobile terminal.

A fifth aspect of the present invention is summarized as a router connected to a destination mobile terminal. The router comprises a selection notifier configured to select a second address of the destination mobile terminal which is associated with a first address of the destination mobile terminal in a second memory, and to notify the selected second address of the destination mobile terminal to a server, when the destination mobile terminal moves auto a predetermined area, or when the destination mobile terminal has changed to an active state; the second address memory configured to store the first address or the destination mobile terminal associated with the second address of the destination mobile terminal; an address converter configured to convert the second address of the destination mobile terminal which is included in a received packet as a destination address, to the first address of the destination mobile terminal which is associated with the second address of the destination mobile terminal in the second address memory; and a packet transferring processor configured to transfer the received packet to the destination mobile terminal, in accordance with me converted destination address.

In the fifth aspect, the address converter can distinguish the first address of the destination mobile terminal from the second address of the destination mobile terminal, in accordance with at least one decision bit in the packet.

In the fifth aspect, the address converter can convert a second address of the source mobile terminal which is included in a received packet as a source address, to a first address of the source mobile terminal which is associated with the second address of the destination mobile terminal.

A sixth aspect of the present invention is summarized as a data structure of a packet for transfer from a source mobile terminal to a destination mobile terminal via a plurality of routers. The most significant bit of an IPv6 address in the packet functions as a decision bit for distinguishing a first address of the destination mobile terminal from the second address of the destination mobile terminal, when a source router connected to the source mobile terminal via a radio circuit converts the first address of the destination mobile terminal which is included in the packet received from the source mobile terminal as a destination address, to the second address of the destination mobile terminal which is associated with the first address of the destination mobile terminal, and routes the received packet to a destination router connected to the destination mobile terminal via a radio circuit, in accordance with the converted destination address, and when the destination router converts the second address of the destination mobile terminal which is included in the received packet as a destination address, to the first address of the destination mobile terminal which is associated with the second address of the destination mobile terminal, and transfers the received packet to the destination mobile terminal, in accordance with the converted destination address.

A seventh aspect of the present invention is summarized as a data structure of a packet for transfer from a source mobile terminal to a destination mobile terminal via a plurality of routers. Any bit in the range of the 33rd bit to 64th bit of an IPv6 address in the packet functions as a decision bit for distinguishing a first address of the destination mobile terminal from the second address of the destination mobile terminal, when a source router connected to the source mobile terminal via a radio circuit converts the first address of the destination mobile terminal which is included an the packet received from the source mobile terminal as a destination address, to the second address of the destination mobile terminal which is associated with the first address of the destination mobile terminal, and routes the received packet to a destination router connected to the destination mobile terminal via a radio circuit, in accordance with the converted destination address, and when the destination router converts the second address of the destination mobile terminal which is included in the received packet as a destination address, to the first address of the destination mobile terminal which is associated with the second address of the destination mobile terminal, and transfers the received packet to the destination mobile terminal, in accordance with true converted destination address.

DETAILED DESCRIPTION OF THE INVENTION

<A Configuration of a Mobile Communication Control System According to an Embodiment of the Present Invention>

Referring to FIG. 1 to FIG. 5, a configuration of a mobile communication control system according to an embodiment of the present invention will be described.

Figure 1:
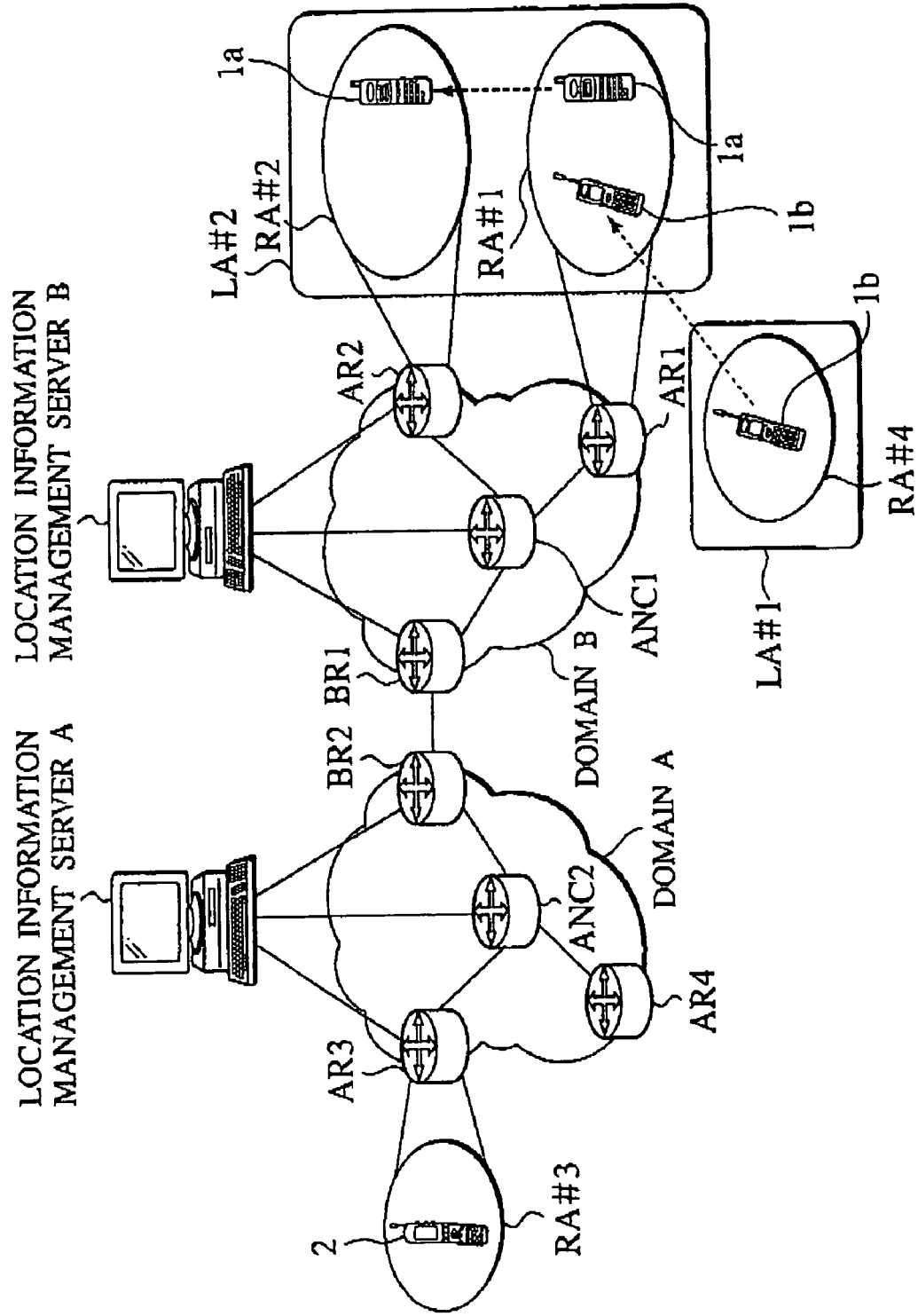
FIG. 1 is a diagram showing the entire configuration of a mobile communication control system according to one embodiment of the present invention.

As shown in FIG. 1, the mobile communication control system a comprises location information management servers A and B, a plurality of access routers AR1 to AR4, a plurality of anchor routers ANC1 and ANC2, and a plurality of border routers BR1 and BR2.

FIG. 1 shows a mobile packet communication network consisting of a domain A and a domain B. The domain A and the domain B can be operated by the same telecommunication carrier or different telecommunication carriers.

The border router BR1 and BR2 connect the domain A to the domain B. Each of the domains A and B consists of a plurality of routers.

In the embodiment, the anchor routers ANC1 and ANC2 comprise a function of an address conversion, and the access routers AR1 to AR4 comprise a function of a first-hop point for mobile terminals.

Routers other than the access routers AR, the bolder router BR and the anchor routers ANC for performing normal IP routing can be connected in the domain A and the domain B.

A configuration whereby the access routers AR1 to AR4 terminate an access point AP terminating a plurality of radio interfaces, or a configuration whereby the access routers AR1 to AR4 support a plurality of radio interfaces by themselves can be adopted.

FIG. 1 shows "location areas LA#1 and LA#2" in which the mobile terminals 1 and 2 perform a location registration to the mobile packet communication network, and "routing areas RA#1 to RA#4" which is a minimum unit per which an IP packet can be routed, as access networks. The local area is managed by one or more access router(s) AR, and the routing area is managed by an access router AR.

In FIG. 1, the mobile terminal 1a in an active state moves from the routing area RA#1 to the routing area RA#2 in the location area LA#2. The mobile terminal 1b in a dormant state moves from the routing area RA#4 in the location area LA#1 to the routing area RA#1 in the location area LA#2. The mobile terminal 2 in an active state exists in the routing area RA#3.

The mobile terminal in the active state can always transmit and receive IP packets. The mobile terminal in the dormant state does not transmit IP packets unless the mobile terminal moves between the location areas LA, even though the mobile terminal receives IP packets, in order to suppress power consumption.

Figure 2:
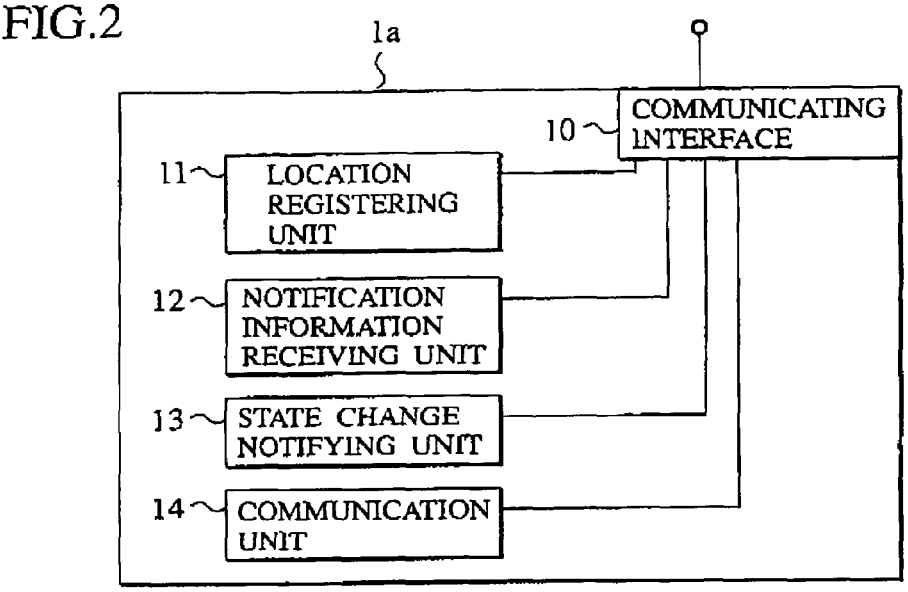
FIG. 2 is a functional block diagram of a mobile terminal in the mobile communication control system according to the embodiment.

Referring to FIG. 2, the configuration of the mobile terminals 1a, 1b and 2 according to the embodiment will be described. Basically, because the configuration of the mobile terminal 1a is the same as the configurations of the mobile terminals 1b and 2, the configuration of the mobile terminal 1a will be described in the following.

As shown in FIG. 2, the mobile terminal 1a is configured with a communicating interface 10, a location registering unit 11, a notification information receiving unit 12, a state change notifying unit 13 and a communication unit 14.

The communicating interface 10 is configured to transmit and receive IP packets to/from the access router AR2 for managing the routing area RA in which the mobile terminal 1a exists via a radio connection.

The location registering unit 11 is configured to register location information of the mobile terminal 1a to the location information management server B connected to the domain B in which the mobile terminal 1a exists via the access router AR2 to which the mobile terminal 1a is connected.

The location registering unit 11 transmits location registering packets to the location information management server B via the access router AR2, when the mobile terminal 1a moves and exists in the other location area LA.

In FIG. 1, the mobile terminal 1b in the dormant state transmits the location registering packets to the access router AR1 when the mobile terminal 1b moves beyond the location area LA (for example, from the location area LA#1 to the location area LA#2).

The mobile terminal 1a in the active state does not transmit the location registering packets, when the mobile terminal 1a moves within the location area LA (for example ample, from the routing area RA#1 to the routing area RA#2).

The notification information receiving unit 12 is configure to receive notification information such as paging information transmitted from the access router AR2.

The state change notifying unit 13 is configured to notify a change of state relating the active state and a change of state relating the dormant state to the access router AR2. The state change notifying unit 13 notifies at least two types of changes of state (the active state and the dormant state).

For example, the state change notifying unit 13 notifies the access router AR2 that the mobile terminal 1a has changed to the active state, when the state of mobile terminal 1a has changed from the dormant state to the active state by specified triggers such as a start of an application and a reception of paging information transmitted from the access router AR2.

The communication unit 14 is configured to create IP packets, for transmission to a destination mobile terminal 2 via the communication interface 11.

The communication unit 14 creates IP packets including an IP host address (a first address) of the destination mobile terminal 2 as a destination address, and an IP host address (a first address) of a source mobile terminal 1a as a source address.

The IP host address (the first address) does not change according to a current location or a movement of a mobile terminal. In other words, the IP host address identifies a mobile terminal uniquely and globally.

On the other hand, an IP routing address which will be discussed later changes according to a current location or a movement of a mobile terminal. In other words, IP packets can be routed in the mobile packet communication network optimally using the IP routing address.

A format (a data structure) of an IP packet includes a decision bit for distinguishing the IP host address (the first address) from the IP routing address (the second address) in routers such as the access routers AR, the border routers BR and the anchor routers ANC. As a result, the conventional home address of the fixed terminal or the Mobile IP terminal can be handled as the IP routing address.

Figure 3:
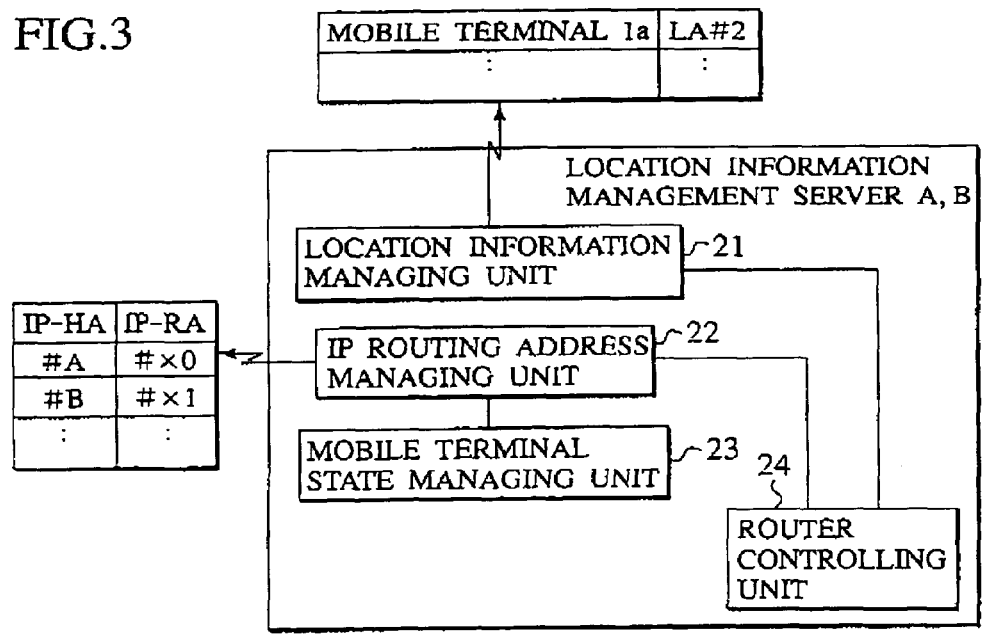
FIG. 3 is a functional block diagram of a location information management server in the mobile communication control system according to the embodiment.

Referring to FIG. 3, the configuration of the location information management server A, B will be described. Basically, because the configuration of the location information management server A is the same as the configuration of the location information management server B, the configuration of the location information management server B will be described in the following.

As shown in FIG. 3, the location information management server B is configured with a location information a managing unit 21, an IP routing address managing unit 22, a mobile terminal state managing unit 23 and a router controlling unit 24.

The location information managing unit 21 is configured to manage information showing each location area in which each of a plurality of mobile terminals (for, example, the mobile terminal 1a) whose home network is the domain B exists at this time. The location information management server B is connected to the domain B.

For example, the location information managing unit 21 stores a table fox associating a mobile terminal ID (1a) with a local area ID (LA#2) in which the mobile terminal exists at this time, in accordance with the location registering packets transmitted from the mobile terminal 1a via the access router AR2 as shown in FIG. 3.

The IP routing address managing unit 22 is configured to manage IP routing address information for associating an IP host address (a first address) or a destination mobile terminal with an IP routing address (a second address) of the destination mobile terminal.

For example, the IP routing address managing unit 22 stores the IP host address #A associated with the IP routing address #X0, and stores the IP host address #B associated with the IP routing address #X1.

The IP routing address managing unit 22 has a function of notifying the IP hose address or the IP routing address of the appropriate mobile terminal to the router such as the access router, the border router and the anchor router, in accordance with an inquiry from the router.

For example, the IP routing address managing unit 22 instructs a source router AR2 connected to a source mobile terminal 1a via a radio circuit to store the IP host address (the first address) of the destination mobile terminal 2 associated with the IP routine address (the second address) of the destination mobile terminal 2.

The IP routing address managing unit 22 has a function of updating the IP routing address information, in accordance with a movement of the destination mobile terminal (a change of the location area in which the mobile terminal exists) or the change of state (the state transition between the active state and the dormant state) of the destination mobile terminal.

For example, the IP routing address managing unit 22 can instruct the routers such as the access routers AR, the border routers BR and the anchor routers ANC to delete a cache table for transmission and a cache table for reception, together with deleting the appropriate IP routing address information, wren the access router notifies the location information management server B that the mobile terminal 1a has changed from the active state to the dormant state.

The IP routing address managing unit 22 has a function of instructing the routers such as the access routers AR, the border routers BR and the anchor routers ANC to convert the IP routing address, in accordance with the IP routing address information.

For example, the IP routing address managing unit 22 can instruct the router AR1 which is not in a route of the packet from the source mobile terminal 1a to the destination mobile terminal 2, to delete the managed IP host address (the managed first address) of the destination mobile terminal 2 and the managed IP routing address (the managed second address) of the destination mobile terminal 2.

The IP routing address managing unit 22 judges whether the IP host address (the first address) and the IP routing address (the second address) of the destination mobile terminal which are notified from the router (for example, the access router AR2) should be allowed to be used or not, and notifies the result or the judgment to the router.

When the result of judgment is affirmative, the IP routing address managing unit 22 manages the IP host address (the first address) of the destination mobile terminal associated with the IP routing address (the second address) of the destination mobile terminal.

The IP routine address managing unit 22 may be configured to manage the IP routing address information of the mobile terminal in the active state only, and not to manage the IP routing address information of the mobile terminal in the dormant state.

The mobile terminal state managing unit 23 is configured to manage the state (active state or dormant state) of each mobile terminal. For example, the mobile terminal state managing unit 23 can manage the state of the mobile terminal whose IP routing address information is managed in the IP routing address managing unit 22 as the active state, and manage the state of the mobile terminal whose IP routing address information is not managed in the IP routing address managing unit 22 as the dormant state.

The router controlling unit 24 is configured to transmit and receive packets such as control packets to/from the routers such as the access routers AR, the border routers BR and the anchor routers ANC within the domain B to which the location information management server B connects, using a predetermined communication protocol.

For example, the router controlling unit 24 transfers the location registering packet received from the mobile terminal 1a via the access router AR2, to the location information managing unit 21.

The router controlling unit 24 transmits the instruction from the IP routing address managing unit 22, to the access router AR2.

Figure 4:
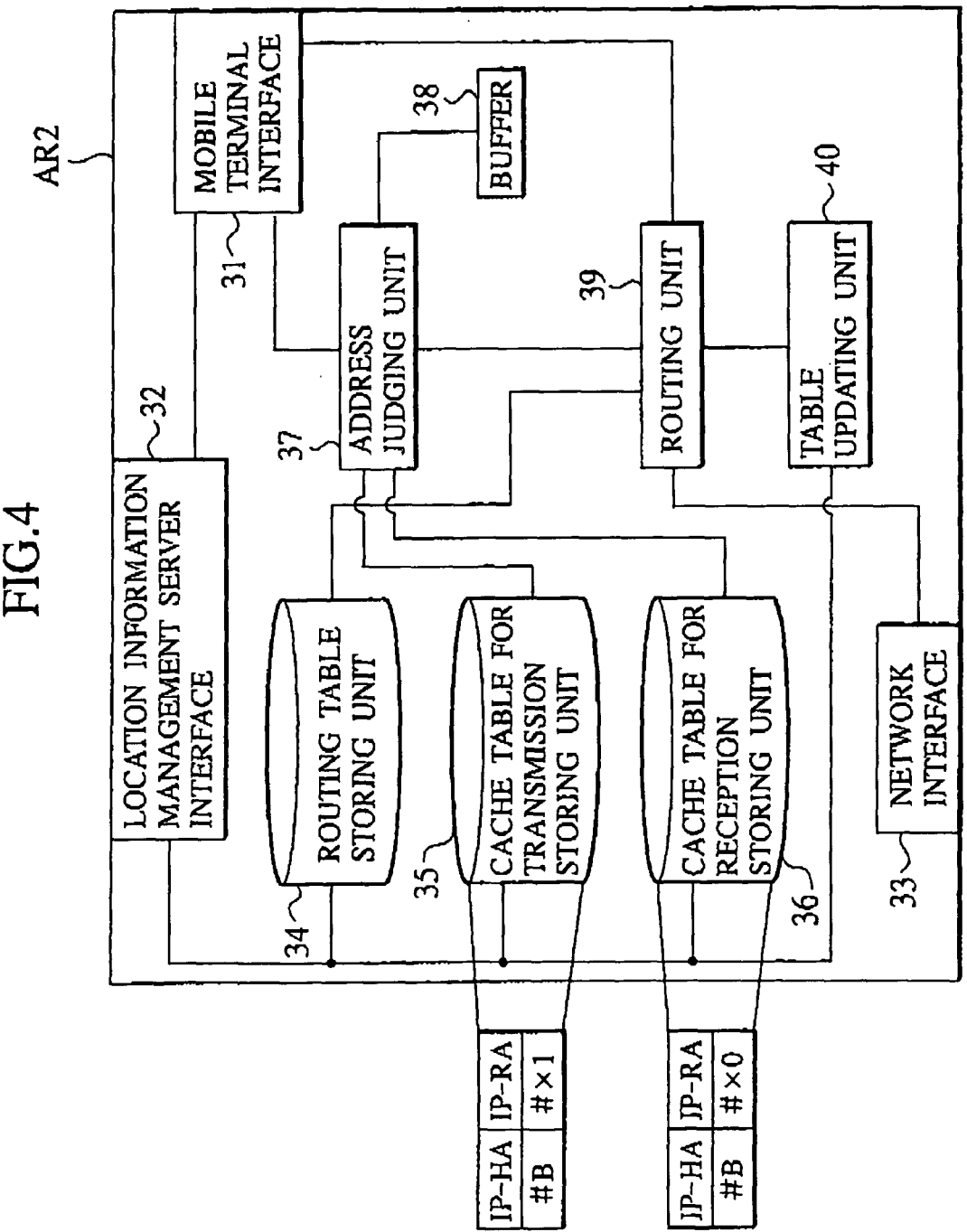
FIG. 4 is a functional block diagram of a router in the mobile communication control system according to the embodiment.
Figure 5:
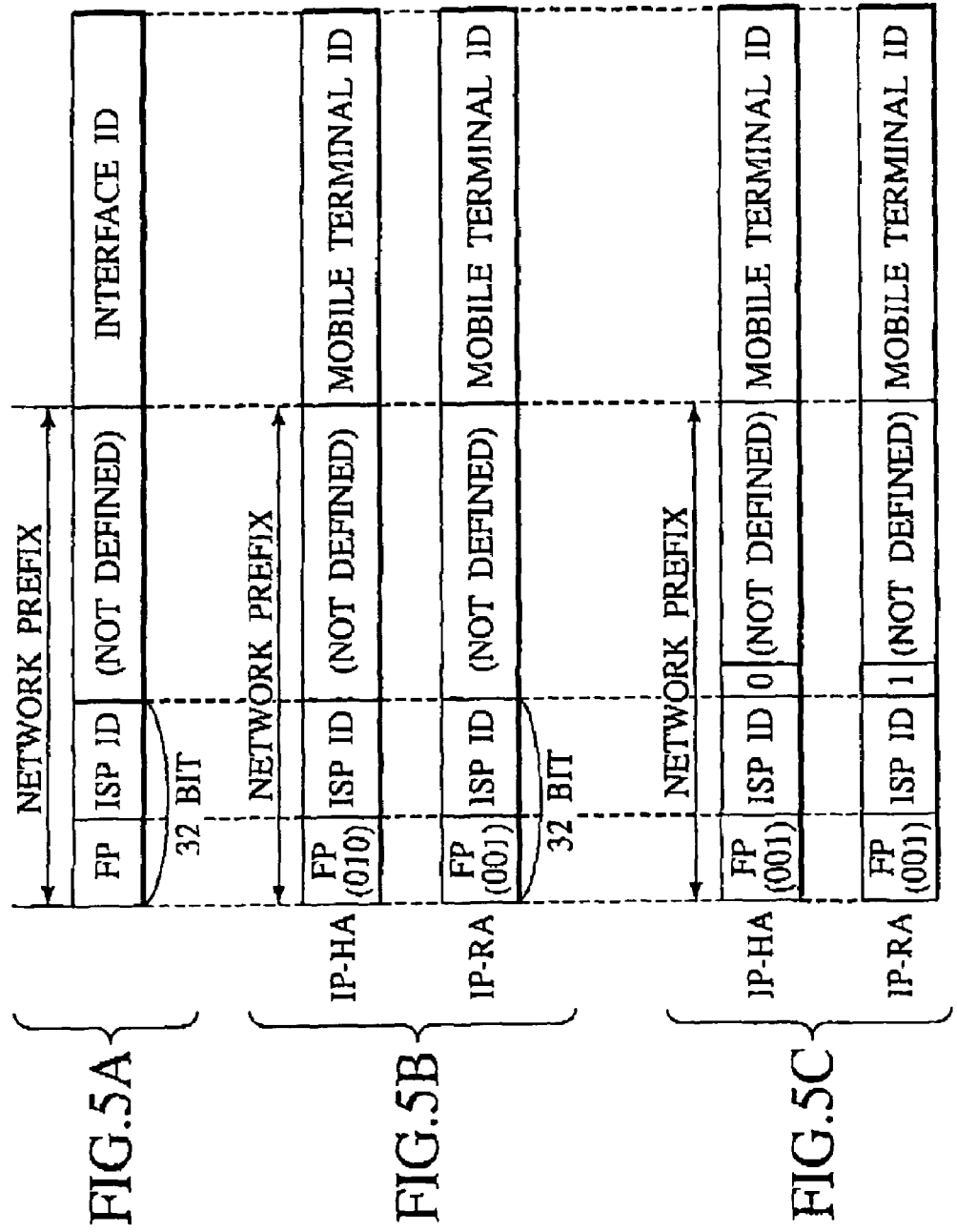
FIG. 5A is diagram illustrating a format of an IP packet used in the mobile communication control system according to the embodiment.
FIG. 5B is diagram illustrating a format of an IP packet used in the mobile communication control system according to the embodiment.
FIG. 5C is diagram illustrating a format of an IP Packet used in the mobile communication control system according to the embodiment.

Referring to FIG. 4, the configuration of the access routers AR1 to AR4, the border routers BR1 and BR2 and the anchor routers ANC1 and ANC2 will be described. Basically, because the configuration of the access routers AR1 to AR4, the border routers BR1 and BR2 and the anchor routers ANC1 and ANC2 are almost the same, the mainly configuration of the mobile terminal 1a will be described in the following, and the unique configuration of each of the routers will be described as appropriate.

As shown in FIG. 4, the access router AR2 is configured with a mobile terminal interface 31, a location information management server interface 32, a network interface 33, a routing table storing unit 34, a cache table for transmission storing unit 35, a cache table for reception storing unit 36, an address judging unit 37, a buffer 38, a routing unit 39 and a table updating unit 40.

The configuration of the anchor router ANC and the border router BR is the same as the configuration of the access router AR2, except that they do not comprise the mobile terminal interface 31.

The mobile terminal interface 31 is configured to transmit and receive packets such as IP packets and location registering packets to/from the mobile terminal 1a which exists is the routing area RA#2 managed by the access router AR2 via radio circuits.

The mobile terminal interface 31 constitutes a selection notifier configured to select the IP routing address (the second address) of the destination mobile terminal 1a which is associated with the IP host address (the first address) of the destination mobile terminal 1a, and to notify the selected IP routing address of the destination mobile terminal 1a to the location information management server B via the location information management server interface 32, when the destination mobile terminal 19 moves into a predetermined area (the routing area RA#2), or when the destination mobile terminal 1a has changed to an active state.

The mobile terminal interface 31 receives various control packets transmitted from the mobile terminal 1a, resolves the address of the location information management server B in accordance with the IP host address which is in the received control packets as the source address, and transfers the control packets to the location information management server B via the location information management server interface 32.

The mobile terminal interface 31 can interpret message contents of a paging packet which is received from the location information management server B via the location information management server interface 32, and perform a paging processing on the mobile terminal.

The location information management server interface 32 is configured to transmit and receive instructions for creating, changing and deleting the cache table for transmission and the cache table for reception, and control packets such as the paging packet to/from the location information management server 8 which is connected to the domain B to which the access router AR2 belongs, using the predetermined communication protocol.

For example, when the mobile terminal in the active state moves from the routing area RA#1 to the routing area RA#2, the location information management server interface 32 triggers a reception of the control packets transmitted from the mobile terminal in the mobile terminal interface 31 to assign an IP routing address to the mobile terminal, and notifies the location information management server B that the IP routing address is assigned to the mobile terminal.

The location information management server interface 32 notifies the table updating unit 40 that the location information management server B allows the IP routing address to be assigned.

When the mobile terminal has changed from the dormant state to the active state in accordance with a trigger such as the start of a specified application and the reception of the paging packet, the location information management server interface 32 assigns one IP routing address extracted out of a IP routing address pool to the mobile terminal, in accordance with notification for notifying that the mobile terminal has changed to the active state. The notification is transmitted from the mobile terminal and received in the mobile terminal interface 31.

The location information management server interface 32 notifies the location information management server B that the IP routing address is assigned to the mobile terminal. The location information management server interface 32 the IP routing address on a formal basis, for notifying to the table updating unit 40, when the location information management server B allows the IP routing address to be assigned to the mobile terminal.

The location information management server interface 32 transfers a location registering message received by the mobile terminal interface 31 to the location information management server B, in accordance with the IP host address of the mobile terminal as a key. The location registering message is transmitted from the mobile terminal when the mobile terminal in the dormant state changes the location area in which the mobile terminal exists. In other words, the location information management server interface 32 functions as the proxy to the mobile terminal.

The network interface 13 is configured to transmit and receive IP packet to/from other routers (for example, the anchor router ANC1) which is in the dormant B to which the access router AR2 belongs.

The routing table storing unit 4 is configured to stove a routing table based on IP routing addresses. For example, the routing table in the access router AR2 stores the routing information to route the IP packets including the IP routing address #X1 to the anchor router ANC1.

The cache table for transmission storing unit 35 constitutes the first address memory configured to store the IP host address (the first address) of the destination mobile terminal associated with the IP routine address (the second address) of the destination mobile terminal, in accordance with the instruction from the location information management server B.

For example, the cache table for transmission storing unit 35 stores a table associating the IP host address #B with the IP routing address #X1 for the mobile terminal which the access router AR2 manages as shown in FIG. 4.

The cache table for reception storing unit 36 constitutes the second address memory configured to store the IP host address (the first address) of the destination mobile terminal associated with the IP routing address (the second address) of the destination mobile terminal, in accordance with the instruction from the location information management server B.

For example, the cache table for reception storing unit 36 stores a table associating the IP routing address #X0 with the IP host address #B for the mobile terminal which the access router AR2 manages as shown in FIG. 4.

The address judging unit 37 is configured to judge whether the source address of the IP packet received from the source mobile terminal is the IP host address (the first address) or the IP routing address (the second address).

To be more specific, the address judging unit 37 judges whether the source address of the IP packet received from the source mobile terminal is the IF host address (the first address) or the IP routing address (the second address), by referring to decision bits in the received IP packets.

Referring to FIG. 5A to FIG. 5C, formats of the IP packets used in the embodiment will be described. In the embodiment, the IP host address and the IP routing address are realized by defining the decision bits in an already-existing IPv6 address system as shown in FIG. 5A.

As shown in FIG. 5B, the method for establishing the decision bits in a format prefix (FP) part defined by 3 bits including the most significant bit of the IPv6 address is considered as a first method. It is defined that "001" is established in the IP part as a global unicast address.

As shown in FIG. 5B, for example, the method establishes "001(the value defined as the global unicast address)" in the IP part for the IP routing address including the as "home address HoA" and the "care of address CoA" which are used the already existing IPv6 type of fixed terminal, the mobile IP terminal and so on. On the other hand, the method define the decision bits by establishing "010" in the IP part for the IP host address.

It is defined that "010" is established as a value in the IP part in the embodiment, but the present invention is not limited to the embodiment, and other values can be established as the value in the FP part.

As shown in FIG. 5C, the method for establishing the decision bit in a bit following an "ISP ID" in the network prefixes is considered as a second method. The "ISP IDs" are assigned to communication carriers or ISPs in accordance with the already-existing assignment rule.

As shown in FIG. 5C, for example, the method defines the decision bit by establishing "1" in the bit following the "ISP ID" for the IP routing address, and establishing "0" in the bit following the "ISP ID" for the IP host address.

It is defined that the decision bit is established in the bit following the "ISP ID" in the embodiment, but the present invention is not limited to the embodiment, and the decision bit can be established in any bit in the range of the 33rd bit to 64th bit of an IPv6 address, or in the range of the 65th bit to 128th bit of an IPv6 address.

The decision bits which can distinguish the IP host address front the IP routing address can be defined by using the first and second method without developing a new address format in the IP packet.

The present invention can distinguish the IP host address from the IP routing address by defining the decision bits in the IPv4 address system as in the case of the IPv6 address system.

When the destination address in the IP packet is judged as being an IP host address, the address judging unit 37 judges whether the IP host address is managed in the cache table for transmission storing unit 35 or not.

When the IP host address is judged as being stored in the cache table for transmission scoring unit 35, the address judging unit 37 constitutes the address converter configured to convert the IP host address (the first address) to the IP routing address (the second address. In this case, the address judging unit 37 transmits the IP packet whose destination address is converted, to the routing unit 39.

On the other hand, when the IP host address is judged as not being stored in the cache table for transmission storing unit 35, the address judging unit 37 buffers the IP packet in the buffet 38 temporarily.

In this case, the address judging unit 37 constitutes an inquirer configured to inquire as to the IP routing address (the second address) of the destination mobile terminal 2 of the location information management server B (or A), in accordance with the IP host address as a destination address.

The address judging unit 37 converts a destination address of the IP packets which are buffered in the buffer 38 from the IP host address to the IP routing address in accordance with a response result form the location information management server B (or A), and transfers the IP packet to the routing unit 39.

When the destination address in the IP packet is judged as being an IP routing address, the address judging unit 37 transfers the IP packet to the routing unit 39 without converting the destination address of the IP packet.

When the destination address in the IP packet is judged as being an IP routing address, and when the IP routing address is stored in the cache table for reception storing unit 36, the address judging unit 37 converts the destination address of the IP packet from the IP routing address to the IP host address, referring to the cache table for reception storing unit 36, and transfers the IP packet to the routing unit 39.

The routing unit 39 is configured to route IP packets to the destination router (the access router) AR3 which is connected to the destination mobile terminal 2 via radio circuits, in accordance with the converted destination address (the IP routing address or the IP host address), referring to the routing table storing unit 34.

In the embodiment, the routing unit 39 transfers the IP packet whose destination address is an IP routing address to the anchor router ANC1 via the network interface 33.

The routing unit 39 constitutes a packet transferring processor configured to transfer the IP packet whose destination address is an IP host address to the mobile terminal 1*a* via the mobile terminal interface 31.

The routing unit 39 performs the routing processing in accordance with predetermined routing protocol such as an OSPF.

The table updating unit 40 is configured to update the routing table storing unit 34, the cache table for transmission storing unit 35 and the cache table for reception storing unit 36, in accordance with the instruction transmitted from the location information management server B via the location information management server interface 32.

The table updating unit 40 adds the IP routing address of the mobile terminal 2 in the cache table for transmission storing unit 35, in accordance with the result of the inquiry to the location information management server B (or A) by the address judging unit 37.

<An Operation of the Mobile Communication Control System According to the Embodiment >

Figure 6:
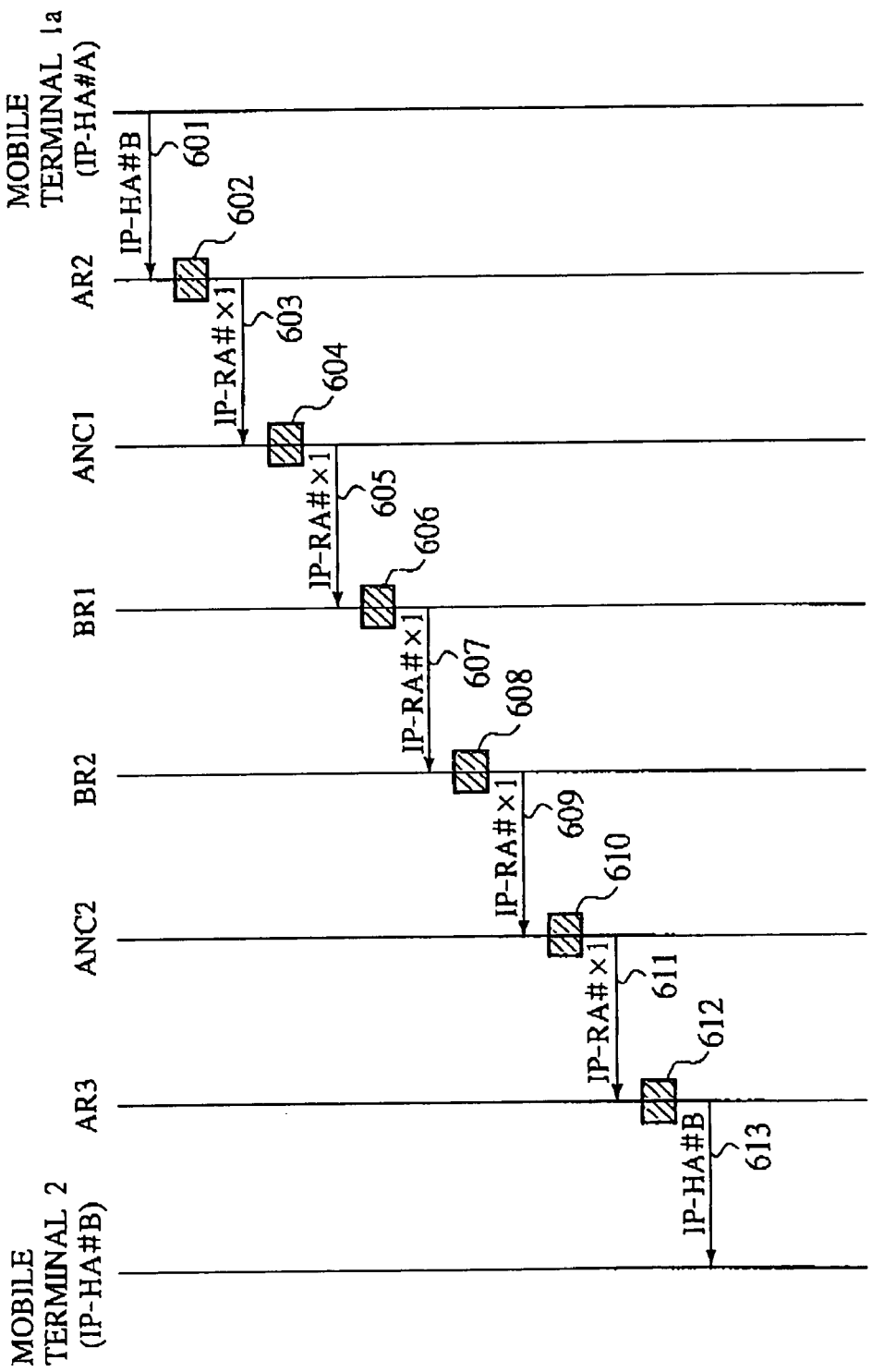
FIG. 6 is a sequence diagram illustrating the operation of the mobile communication control system according to the embodiment.

Referring to FIG. 6, the operation whereby IP packets are transferred from a mobile terminal 1*a* to a mobile terminal 2 in the mobile communication control according to the embodiment will be described. In the embodiment, the IP host address (the first address) of the mobile terminal 1*a* is "A", and the IP host address (the first address) of true mobile terminal 2 is "B"

As shown in FIG. 6, in step 601, the mobile terminal 1*a* transmits an IP packet which includes the IP host address (the first address) "B" of the mobile terminal 2 as a destination address, to an access router AR2 via ratio circuits.

In step 602, the address judging unit 37 of the access router AR2 converts the destination address of the received IP packet from the IP routing address (the first address) "B", of the mobile terminal 2 to the IP host address (the second address) "X1" of the mobile terminal 2, referring to the cache table for reception storing unit 36, referring to the cache table for transmission storing unit 35.

In step 603, the routing unit 39 of the access router AR2 transfers the address-converted IP packet whose destination address is "X1" to an anchor router ANC1, referring to the routing table storing unit 34.

In step 604, the address judging unit 37 of the anchor router ANC1 judges that the IP routing address (the second address) "X1" of the mobile terminal 2 is established in the received IP packet by the decision bits in the received IP packet.

In step 605, the routing unit 39 of the anchor router ANC1 transfers the IP packet whose destination address is "X1" to a border routes BR1 without converting the destination address, referring to the routing table storing unit 34.

The IP packet which includes the IP routing address (the second address) "X1" of the mobile terminal 2 is transferred to an access router AR3 which is connected to the destination mobile terminal 2 via radio circuits, by repeating the step 604 and the step 605 from the step 606 to the step 611.

In step 612, the address judging unit 37 of the access router AR3 converts the destination address of the received IP packet from the IP routing address (the second address) "1" of the mobile terminal 2 to the IP host address (the first address) "B" of the mobile terminal 2, referring to the cache table for transmission storing unit 35.

In step 613, the routing unit 39 of the access router AR3 transfers the address-converted IP packet whose destination address as "B" to the mobile terminal 2 via radio circuits, referring to the routing table storing unit 34.

<Functions and Effects of the Mobile Communication Control System According to the Embodiment>

In the mobile communication control system according to the embodiment, the source router AR2 routes IP packets to the destination router AR3 based on the converted IP routing address (the converted second address), and the destination router AR3 transfers the IP pickets to the destination mobile terminal 2 based on the converted IP host address (the converted first address), so as to avoid the communication route redundancy (the triangle route) in downward communication.

In the mobile communication control system according to the embodiment, the destination mobile terminal 2 does not have to receive the care of address CoA including the current location information on the source mobile terminal 1*a*, so as to avoid the location privacy problem whereby the current location information LA#2 of the source mobile terminal 1*a* is revealed to the destination mobile terminal 2.

In the mobile communication control system according to the embodiment, the IP host address (the first address) is used as a destination address of IP packets transmitted from the source mobile terminal 1*a* in upward communication, so as to prevent the current location information LA#2 of the source mobile terminal 1*a* from being revealed to the destination mobile terminal 2.

In the mobile communication control system according to the embodiment, the source router AR2 does not perform encapsulation of IP packets, so as to avoid an increase of the overheads of the IP packets.

In the mobile communication control system according to the embodiment, the router controlling unit 24 of the location information management server B instructs the source router AR2 to associate the IP host address (the first address) of the destination mobile terminal 2 with the IP routine address (the second address) of the destination mobile terminal 2, so that the IP address of the hose agent managing the current location information LA#2 of the source mobile terminal 1a does not have to be notified to the source mobile terminal 1a in advance, and the source mobile terminal 1a does not have to perform a location registration to the home agent of the home network directly. As a result, the possibility whereby the IP address itself of the home agent managing and controlling mobility is revealed to an outsider can be avoided, and the IP address itself is impenetrable to unauthorized attack.

In the mobile communication control system according to the embodiment, the router controlling unit 24 of the location information management server B instructs the source router AR2 to associate the IP lost address (the first address) of the destination mobile terminal 2 with the IP routing address (the second address) of the destination mobile terminal 2, so that the precision for notifying the IP routing address (the second address) to other domains can be loose, the range of control of the mobile terminal by the routers can be narrow, and higher hand-over can be performed.

<A Modification>

The present invention is not limited to the above embodiment. For example, the present invention can be configured to convert the IP routing address in all routers such as the anchor router ANC1 and the border router BR1 within the specified domain (for example, the domain B). For example, the anchor router ANC1 can convert the IP routine address from "X1" to "X2", the border route BR1 can convert the IP routing address from "X2" to "X3" in the present invention.

For example, the present invention can be configured to convert the IP routing address in some of routers such as the anchor router ANC1 within the specified domain (for example, the domain A).

In the present invention, the routers which convert the IP routing address are different between the upward direction (the direction front the mobile terminal 1a to the mobile terminal 2) and the downward direction (the direction from type mobile terminal 2 to the mobile terminal 1).

The present invention can be applied not only in the case that address conversion is performed for the destination address but also in the case that address conversion is performed for the source address.

The present invention can provide a mobile communication control system which can avoid communication route redundancy, and prevent the current location information of the source mobile terminal and the IP address of the location information management server from being revealed, and a router, a server and a data structure which can be used in the above mobile communication control system.

Additional advantages and modifications will readily occur to those skilled in the art. Therefore, the invention in its broader aspects is not limited to the specific details and the representative embodiment shown and described herein. Accordingly, various modifications may be made without departing from the spirit or scope of the general inventive concept as defined by the appended claims and their equivalents

What is claimed is:

1. A mobile communication control system comprising a server and a plurality of routers, wherein the server comprises:

an address manager configured to manage a host address of a destination mobile terminal associated with a routing address of the destination mobile terminal; and an instructor configured to instruct a source router connected to a source mobile terminal via a radio circuit and a destination router connected to the destination mobile terminal via a radio circuit to store the host address of the destination mobile terminal associated with the routing address of the destination mobile terminal;

wherein the source router comprises:

a first address memory configured to store the host address of the destination mobile terminal associated with the routing address of the destination mobile terminal, in accordance with the instruction from the server;

an address converter configured to delete the host address of the destination mobile terminal which is included in a packet received from the source mobile terminal as a destination address, and add the routing address of the destination mobile terminal which is associated with the host address of the destination mobile terminal in the first address memory to the packet; and a routing processor configured to route the received packet to a destination router connected to the destination mobile terminal, in accordance with the routing address of the destination mobile terminal;

and wherein the destination router comprises:

a second address memory configured to store the host address of the destination mobile terminal associated with the routing address of the destination mobile terminal;

an address converter configured to delete the routing address of the destination mobile terminal which is included in the received packet as a destination address, and add the host address of the destination mobile terminal which is associated with the routing address of the destination mobile terminal in the second address memory to the packet; and a packet transferring processor configured to transfer the received packet to the destination mobile terminal, in accordance with the host address of the destination mobile terminal.

2. The mobile communication control system according to claim 1, wherein the destination router further comprises a selection notifier configured to select the routing address of the destination mobile terminal which is associated with the host address of the destination mobile terminal in the second memory, and to notify the selected routing address of the destination mobile terminal to the server, when the destination mobile terminal moves into a predetermined area, or when the destination mobile terminal changes to an active state;

and wherein the address manager of the server is configured to manage the notified routing address of the destination mobile terminal associated with the host address of the destination mobile terminal.

3. The mobile communication control system according to claim 1, wherein the source router further comprises an inquirer configured to inquire as to the routing address of the destination mobile terminal of the server, when the host address memory does not store the routing address of the destination mobile terminal associated with the host address of the destination mobile terminal which is included in the packet received from the source mobile terminal as a destination address; and the instructor of the server instructs the source router to store the host address of the destination mobile terminal associated with the routing address of the destination mobile terminal, in accordance with the inquiry from the source router.

4. The mobile communication control system according to claim 1, wherein the address manager of the server is configured to update the host address of the destination mobile terminal and the routing address of the destination mobile terminal which are associated with each other, in accordance with a movement of the destination mobile terminal or a change of state of the destination mobile terminal.

5. The mobile communication control system according to claim 1, wherein the instructor of the server is configured to instruct a router which is not in a route of the packet from the source mobile terminal to the destination mobile terminal, to delete the managed host address of the destination mobile terminal and the managed routing address of the destination mobile terminal.

6. The mobile communication control system according to claim 1, wherein the address converter of the source router or the destination router is configured to distinguish the host address of the destination mobile terminal from the routing address of the destination mobile terminal, in accordance with at least one decision bit in the packet.

7. The mobile communication control system to claim 1, wherein
the address converter of the source router is configured to delete a host address of the source mobile terminal which is included in the packet received from the source mobile terminal as a source address, and add a routing address of the source mobile terminal which is associated with the host address of the source mobile terminal to the packet; and
the address converter of the destination router is configured to delete the routing address of the source mobile terminal which is included in the received packet as a source address, and add the host address of the source mobile terminal which is associated with the routing address of the source mobile terminal to the packet.

8. A mobile communication control method comprising the steps of:
transmitting a packet including a host address of a destination mobile terminal as a destination address, in a source mobile terminal;
instructing a source router connected to the source mobile terminal via a radio circuit and a destination router connected to the destination mobile terminal via a radio circuit to store the host address of the destination mobile terminal associated with a routing address of the destination mobile terminal, in a server;
storing the host address of the destination mobile terminal associated with the routing address of the destination mobile terminal, in accordance with the instruction from the server, in the source router;
deleting the host address of the destination mobile terminal which is included in the packet received from the source mobile terminal as a destination address, and adding the routing address of the destination mobile terminal which is associated with the host address of the destination mobile terminal to the packet, in the source router;
routing the received packet to the destination router connected to the destination mobile terminal, in accordance with the routing address of the destination mobile terminal, in the source router;
deleting the routing address of the destination mobile terminal which is included in the received packet as a destination address, and adding the host address of the destination mobile terminal which is associated with the routing address of the destination mobile terminal to the packet, in the destination router; and
transferring the received packet to the destination mobile terminal, in accordance with the host address of the destination mobile terminal.

9. A server used in a mobile communication network for transferring a packet from a source mobile terminal to a destination mobile terminal via a plurality of routers, the server comprising:
an address manager configured to manage a host address of the destination mobile terminal associated with a routing address of the destination mobile terminal; and
an instructor configured to instruct a source router connected to the source mobile terminal via a radio circuit and a destination router connected to the destination mobile terminal via a radio circuit to store the host address of the destination mobile terminal associated with the routing address of the destination mobile terminal.

10. The server according to claim 9, wherein the address manager is configured to update the host address of the destination mobile terminal and the routing address of the destination mobile terminal which are associated with each other, in accordance with a movement of the destination mobile terminal or a change of state of the destination mobile terminal.

11. The server according to claim 9, wherein the instructor is configured to instruct a router which is not in a route of the packet from the source mobile terminal to the destination mobile terminal, to delete the managed host address of the destination mobile terminal and the managed routing address of the destination mobile terminal.

12. A router connected to a source mobile terminal comprising:
an inquirer configured to inquire as to a routing address of a destination mobile terminal of a server, when a first address memory does not store the routing address of the destination mobile terminal associated with a host address of the destination mobile terminal which is included in a packet received from the source mobile terminal as a destination address;
the first address memory configured to store the host address of the destination mobile terminal associated with the routing address of the destination mobile terminal, in accordance with an instruction from the server;
an address converter configured to delete the host address of the destination mobile terminal which is included in the packet received from the source mobile terminal as a destination address, and add the routing address of the destination mobile terminal which is associated with the host address of the destination mobile terminal in the first address memory to the packet; and
a routing processor configured to route the received packet to a destination router connected to the destination mobile terminal via a radio circuit, in accordance with the routing address of the destination mobile terminal.

13. The router according to claim 12, wherein the address converter is configured to distinguish the host address of the destination mobile terminal from the routing address of the destination mobile terminal, in accordance with at least one decision bit in the packet.

14. The router according to claim 12, wherein the address converter is configured to distinguish the host address of the destination mobile terminal from the routing address of the destination mobile terminal, by using a most significant bit of an IPv6 address in the packet.

15. The router according to claim 12, wherein the address converter is configured to distinguish the host address of the destination mobile terminal from the routing address of the destination mobile terminal, by using a most significant bit of an IPv6 address in the packet, by using any bit in a range of a 33rd bit to a 64th bit of an IPv6 address in the packet.

16. The router according to claim 12, wherein the address converter is configured to delete a host address of the source mobile terminal which is included in the packet received from the source mobile terminal as a source address, and add a routing address of the source mobile terminal which is associated with the host address of the source mobile terminal to the packet.

17. A router connected to a destination mobile terminal comprising:
- a selection notifier configured to select a routing address of the destination mobile terminal which is associated with a host address of the destination mobile terminal in a second memory, and to notify the selected routing address of the destination mobile terminal to a server, when the destination mobile terminal moves into a predetermined area, or when the destination mobile terminal has changed to an active state;
- the second address memory configured to store the host address of the destination mobile terminal associated with the routing address of the destination mobile terminal;
- an address converter configured to delete the routing address of the destination mobile terminal which is included in a received packet as a destination address, and add the host address of the destination mobile terminal which is associated with the routing address of the destination mobile terminal in the second address memory to the packet; and
- a packet transferring processor configured to transfer the received packet to the destination mobile terminal, in accordance with the host address of the destination mobile terminal.

18. The router according to claim 17, wherein the address converter is configured to distinguish the host address of the destination mobile terminal from the routing address of the destination mobile terminal, in accordance with at least one decision bit in the packet.

19. The router according to claim 17, wherein the address converter is configured to delete a routing address of the source mobile terminal which is included in the received packet as a source address, and add a host address of the source mobile terminal which is associated with the routing address of the source mobile terminal to the packet.

20. The router according to claim 17, wherein the address converter is configured to distinguish the host address of the destination mobile terminal from the routing address of the destination mobile terminal, by using a most significant bit of an IPv6 address in the packet.

21. The router according to claim 17, wherein the address converter is configured to distinguish the host address of the destination mobile terminal from the routing address of the destination mobile terminal, by using a most significant bit of an IPv6 address in the packet, by using any bit in a range of a 33rd bit to 64th bit of an 6 address in the packet.

* * * * *